(12) United States Patent
Konishi et al.

(10) Patent No.: US 8,946,104 B2
(45) Date of Patent: Feb. 3, 2015

(54) DIELECTRIC CERAMIC, METHOD OF MANUFACTURING DIELECTRIC CERAMIC, AND MULTILAYER CERAMIC CAPACITOR

(71) Applicant: Taiyo Yuden Co., Ltd., Taito-ku, Tokyo (JP)

(72) Inventors: Yukihiro Konishi, Takasaki (JP); Yusuke Kowase, Takasaki (JP); Kazumichi Hiroi, Takasaki (JP); Kotaro Mizuno, Takasaki (JP); Ayumu Sato, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 69 days.

(21) Appl. No.: 13/921,771

(22) Filed: Jun. 19, 2013

(65) Prior Publication Data

US 2013/0342957 A1    Dec. 26, 2013

(30) Foreign Application Priority Data

Jun. 21, 2012    (JP) .................................. 2012-139801

(51) Int. Cl.
*C04B 35/468*    (2006.01)
*H01G 4/10*    (2006.01)
*H01G 4/12*    (2006.01)
(Continued)

(52) U.S. Cl.
CPC ........... *H01G 4/1218* (2013.01); *H01G 4/1209* (2013.01); *H01G 4/30* (2013.01); *H01G 4/1227* (2013.01); *B32B 18/00* (2013.01); *C04B 35/4682* (2013.01); *B82Y 30/00* (2013.01); *C04B 2235/3236* (2013.01); *C04B 2235/5445* (2013.01); *C04B 2235/5454* (2013.01); *C04B 2235/656* (2013.01); *C04B 2235/6584* (2013.01); *C04B 2235/663* (2013.01); *C04B 2235/782* (2013.01); *C04B 2235/784* (2013.01);
(Continued)

(58) Field of Classification Search
CPC .................................................... C04B 35/4682
USPC ........................ 501/137, 138, 139; 361/321.4
See application file for complete search history.

(56) References Cited

U.S. PATENT DOCUMENTS 8,238,077 B2 *   8/2012   Yamazaki et al. ......... 361/321.4
8,420,559 B2 *   4/2013   Nishigaki et al. ............. 501/138
(Continued)

FOREIGN PATENT DOCUMENTS

| JP | 2004-345927 A | 12/2004 |
| JP | 2007-201277 A | 8/2007 |
| JP | 2010-006633 A | 1/2010 |
| WO | 2008/123320 A1 | 10/2008 |

(Continued)

OTHER PUBLICATIONS

A Notification of Reasons for Refusal issued by the Japanese Patent Office, mailed Apr. 30, 2014, for Japanese counterpart application No. 2012-139801.

*Primary Examiner* — Karl Group
(74) *Attorney, Agent, or Firm* — Law Office of Katsuhiro Arai

(57) ABSTRACT

A dielectric ceramic whose primary component is an $ABO_3$ compound (A contains Ba and B contains Ti) has a per-layer thickness of approx. 0.5 μm or less, where the volume ratio to all dielectric sintered grains of those whose grain size is in a range of 0.02 μm to 0.15 μm is adjusted to a grain size distribution of 1% to 10%. High dielectric constant and high reliability can be achieved at the same time with the dielectric ceramic.

6 Claims, 7 Drawing Sheets

(51) Int. Cl.
*H01G 4/30* (2006.01)
*B32B 18/00* (2006.01)
*B82Y 30/00* (2011.01)

(52) U.S. Cl.
CPC ..... *C04B2235/785* (2013.01); *C04B 2237/346* (2013.01); *C04B 2237/704* (2013.01)

USPC ......... 501/137; 501/138; 501/139; 361/321.4

(56) References Cited

U.S. PATENT DOCUMENTS

2010/0014214 A1  1/2010  Yamazaki et al.
2011/0019334 A1  1/2011  Nishigaki et al.

FOREIGN PATENT DOCUMENTS

WO  2009/119614 A1  10/2009
WO  2009/157231 A1  12/2009

\* cited by examiner

DIELECTRIC CERAMIC, METHOD OF MANUFACTURING DIELECTRIC CERAMIC, AND MULTILAYER CERAMIC CAPACITOR

BACKGROUND

1. Field of the Invention

The present invention relates to a dielectric ceramic, a method of manufacturing a dielectric ceramic, and multilayer ceramic capacitor (MLCC) constituted by dielectric ceramics stacked densely.

2. Description of the Related Art

As mobile phones and other digital electronic devices become increasingly smaller and thinner, laminated ceramic electronic components that are surface-mounted on electronic circuit boards, etc., are getting smaller. In particular, multilayer ceramic capacitors that are laminated ceramic electronic components are seeing growing requirements every year for capacity increase to support decreasing chip sizes. Multilayer ceramic capacitors have a structure whereby dielectric layers constituted by dielectric ceramics and internal electrode layers are stacked alternately.

In general, reducing the capacitor size inevitably reduces the area of the electrode layers facing the dielectric layers and therefore decreases the capacitance. Accordingly, it is essential, in ensuring enough capacitance of the capacitor to support decreasing chip sizes, to make the dielectric layers and electrode layers thinner and incorporate technology to densely stack them in multiple layers.

In the meantime, among the known dielectric ceramics offering good dielectric constant vs. temperature characteristics are those whose ceramic crystal has a core-shell structure. For example, it is known that, by adding to the primary component of $BaTiO_3$ (barium titanate) a component that contains rare earth metal, etc., and then sintering the component mixture while suppressing grain growth, dielectric ceramics of core-shell structure whose dielectric constant is subject to minimal temperature-dependent change can be obtained (refer to Patent Literature 1, for example).

According to Patent Literature 1, $ABO_3$ compound (A represents Ba, Ba—Ca or Ba—Ca—Sr, while B represents Ti or Ti—Zr) is used as the dielectric ceramic component, where the average grain size of the material powder thereof is 0.1 μm to 0.3 μm. The requirements for obtaining the specified temperature characteristics include the sintered ceramic crystal meeting "Core size<0.4×Grain size" and the average grain size being in a range of 0.15 μm to 0.8 μm.

BACKGROUND ART LITERATURES

[Patent Literature 1] Japanese Patent Laid-open No. 2004-345927

SUMMARY

In recent years, there is a need for higher integration of chip-type multilayer ceramic capacitors and there are quite a number of chip-type multilayer ceramic capacitors formed with 0.5-μm or thinner dielectric layers, each constituted by a dielectric ceramic. In the case of dielectric ceramics of core-shell structure whose thickness is 0.5 μm or less, adjusting its grain size to the range in the prior art mentioned above (0.15 μm to 0.8 μm) makes the thickness of the dielectric layer roughly equivalent to the grain size, which in turn makes it impossible to secure a sufficient number of grain boundaries. As a result, product reliability can drop due to shorting (electrical short-circuit), cracks (structural defects), etc., occurring easily. This is because the grain boundary has higher electrical insulation property than does the individual sintered grain of the dielectric, and also because the grain boundary has the effect of dispersing the internal stress generated by sintering. In addition, there is a problem whereby an attempt to secure more grain boundaries by suppressing the growth of dielectric grains due to sintering makes the grain size relatively smaller and the overall dielectric constant drops due to this smaller size.

The present invention was developed to solve the aforementioned problems and it is an object of the present invention to provide a dielectric ceramic, and a method of manufacturing the dielectric ceramic or multilayer ceramic capacitor manufactured by using the foregoing, designed to secure a sufficient number of grain boundaries to suppress occurrence of shorting, structural defects, etc., while achieving a high dielectric constant (capacitance) at the same time, even when the thickness of the dielectric ceramic of core-shell structure is reduced to 0.5 μm or less To solved the aforementioned problems, the present invention provides a dielectric ceramic whose primary component is an $ABO_3$ compound (A contains Ba (barium) and B contains Ti (titanium)), where the volume ratio to total dielectric sintered grains of those whose grain size is in a range of 0.02 μm to 0.15 μm is 1% to 10%.

Preferably, the aforementioned dielectric ceramic has an average grain size of total sintered grains in a range of 0.13 μm to 0.25 μm.

In addition, the present invention provides a method of manufacturing a dielectric ceramic that includes: a step to prepare dielectric green sheets by adding an auxiliary component of 0.1 μm or less in grain size to a material powder for primary component constituted by an $ABO_3$ compound and having a grain size of 0.05 μm to 0.12 μm; and a step to sinter the dielectric green sheets so that the volume ratio to total dielectric sintered grains of those whose grain size is in a range of 0.02 μm to 0.15 μm becomes 1% to 10%.

Preferably, in the aforementioned manufacturing method, an average grain size of total sintered grains constituting the dielectric ceramic is in a range of 0.13 μm to 0.25 μm.

Additionally, the present invention provides a multilayer ceramic capacitor formed by alternately stacking dielectric layers constituted by dielectric ceramics, and electrode layers, wherein the thickness of the dielectric layer is 0.5 μm or less, the primary component of the dielectric layer is an $ABO_3$ compound (A contains Ba (barium) and B contains Ti (titanium)), and the volume ratio to total dielectric sintered grains of those whose grain size is in a range of 0.02 μm to 0.15 μm is 1% to 10%.

Preferably, the aforementioned multilayer ceramic capacitor has an average grain size of total sintered grains constituting the dielectric layer in a range of 0.13 μm to 0.25 μm.

According to the present invention, a highly reliable laminated ceramic electronic component can be provided that suppresses structural defects even when its size is reduced and also has electrode layers offering high coverage. Furthermore, a multilayer ceramic capacitor comprising dielectric layers and internal electrode layers densely stacked together can achieve high capacity and high reliability at the same time.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

| Description of the Symbols | |
|---|---|
| 1 | Multilayer ceramic capacitor |
| 10 | Sintered compact |
| 12 | Dielectric layer (dielectric ceramic) |
| 13 | Internal electrode layer |
| 15 | Cover layer |
| 20 | External electrode |

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DETAILED DESCRIPTION OF EMBODIMENTS

Figure 1:
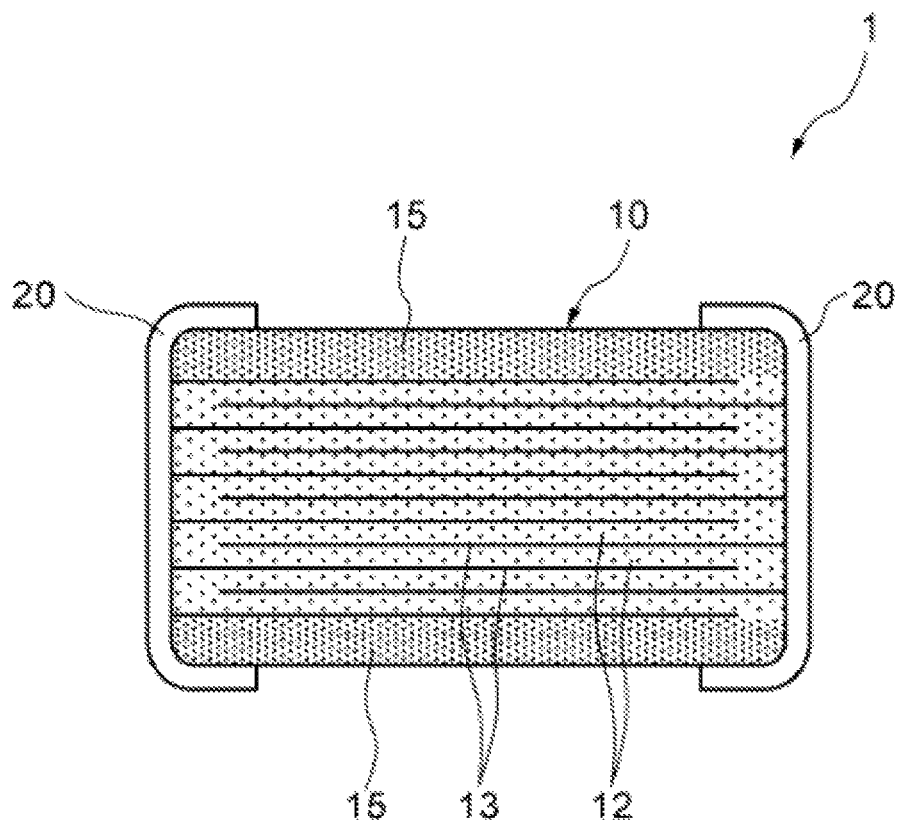
FIG. 1 is a longitudinal section view showing the rough structure of a multilayer ceramic capacitor according to one embodiment of the present invention.

As an embodiment of the present invention, the following illustrates a dielectric ceramic having a core-shell structure, as well as a multilayer ceramic capacitor constituted by stacking the dielectric ceramic as the dielectric layers. FIG. 1 is a longitudinal section view showing the rough structure of a multilayer ceramic capacitor 1 according to one embodiment of the present invention. The multilayer ceramic capacitor 1 roughly comprises a sintered compact 10 having the specified chip dimensions and shape (such as a rectangular solid of 1.0 mm×0.5 mm×0.5 mm) and a pair of external electrodes 20, 20 formed on both sides of the sintered compact 10. The sintered compact 10 is formed by alternately stacking dielectric layers 12 constituted by dielectric ceramic and internal electrode layers 13, with cover layers 15 formed as outermost layers of the foregoing. The dielectric layers 12 and cover layers 15 are sintered using $BaTiO_3$ (barium titanate) as the primary component, for example, while the internal electrode layers 13 are sintered using Ni (nickel) as the primary component, for example.

Depending on the capacitance, ability to withstand pressure, and other specifications required of the capacitor, the sintered compact 10 has a high-density, multilayer structure where that the thickness of one dielectric layer 12 sandwiched by two internal electrode layers 13 is 0.5 μm or less, the thickness of the internal electrode layer 13 is 0.6 μm or less, and the total number of layers runs in a range of several hundreds. The cover layers 15 formed as the outermost layers of the sintered compact 10 are designed to protect the dielectric layers 12 and internal electrode layers 13 from humidity, contaminants and other contaminating elements present on the outside and prevent deterioration of these layers over time.

The multilayer ceramic capacitor 1 is manufactured through the following process, for example. First, metal oxide and/or metal organic complex powder is added as an auxiliary component to material powder for dielectric ceramic whose primary component is an $ABO_3$ compound (A represents Ba (barium), Ba—Ca (calcium), Ba—Ca—Sr (strontium), etc., while B represents Ti (titanium), Ti—Zr (zirconium), etc.), after which the powder mixture is wet-mixed, dried and then pulverized to prepare dielectric material powder. Among $ABO_3$ compounds, $BaTiO_3$ (hereinafter sometimes abbreviated as "BT") can be used as the primary component of the dielectric.

For the auxiliary component added to the primary component, $Ho_2O_3$ (holmium oxide), MgO (magnesium oxide), $MnCO_3$ (manganese carbonate), $SiO_2$ (silicon oxide), etc., can be used, for example.

The average powder grain size of the $ABO_3$ compound used as the primary component of dielectric material powder is preferably in a range of 0.02 μm to 0.12 μm, or more preferably in a range of 0.05 μm to 0.12 μm. The average powder grain size of the auxiliary component is preferably 0.1 μm or less.

The prepared dielectric material powder is wet-mixed with polyvinyl acetal resin and organic solvent, after which the mixed powder is applied onto strip-shaped dielectric green sheets of 0.5 μm or less using the doctor blade method, for example, and then dried. Next, conductive paste containing organic binder is screen-printed onto the surfaces of dielectric green sheets to put in place patterns for internal electrode layers 13. For the metal powder of conductive paste, Ni, Co (cobalt), Cu (copper), etc., can be used, for example, but Ni is a favorable choice when cost, oxidation resistance, etc., are considered. It is also possible to uniformly disperse dielectric material powder of 50 nm or less in grain size (such as $BaTiO_3$), as common material. This is because the co-material would prevent contact between metal powders to suppress crystal growth. Conductive paste constituted by mixing Mg or Cr (chromium) with the primary component of Ni can also be used.

Preferably the thickness of the sintered internal electrode layer 13 is approx. 0.5 μm or less, and the thickness to which the conductive paste is printed onto the dielectric green sheet is adjusted accordingly.

Next, the specified number of dielectric green sheets that have been stamped to a size of 15 cm×15 cm, for example, are stacked alternately with the internal electrode layers 13. Cover sheets to become the cover layers 15 are then pressure-bonded onto the stacked dielectric green sheet at the top and bottom and the entire laminate is cut to the specified chip dimensions (such as 1.0 mm×0.5 mm), after which conductive paste to form the external electrodes 20, 20 is applied on both sides of the laminate and then dried. This way, a molding of multilayer ceramic capacitor 1 is obtained.

The molding thus obtained is put in a $N_2$ ambience of approx. 350° C. to remove the binder, and then sintered for 10 minutes to 2 hours in a reducing mixture gas comprising $N_2$, $H_2$ and $H_2O$ (where the partial oxygen pressure is approx. $1.0 \times 10^{-11}$ MPa) by adjusting the temperature in a range of 1140 to 1260° C. as deemed appropriate. The sintered dielectrics are then oxidized for approx. 1 hour in a $N_2$ ambience of approx. 1000° C. to obtain a multilayer ceramic capacitor 1 whose sintered grains constituting the dielectric layers have grown to a desired grain size distribution.

With the multilayer ceramic capacitor 1 obtained by sintering based on the above conditions, the average grain size of total sintered grains constituting the dielectric layer 12 being dielectric ceramic is preferably in a range of 0.13 μm to 0.25 μm. In addition, the volume ratio to total sintered grains constituting the dielectric layer 12 of those whose grain size is in a range of 0.02 μm to 0.15 μm is preferably 1% to 10%.

The aforementioned desired grain size distribution in the dielectric ceramic can be obtained by, for example, controlling the powder grain size distribution of the primary component, type or composition of the auxiliary component, ratio of added quantities, etc., as deemed appropriate. The sintering ambience and sintering profile (sintering time and temperature) can also be controlled. Additionally, the grain size distribution can be controlled, even when the types of elements constituting the auxiliary component remain the same, by changing the form of compound of the auxiliary component (such as complex, hydroxide, etc.).

Next, an example of a multilayer ceramic capacitor (hereinafter referred to as "MLCC") formed by densely stacking dielectric layers constituted by dielectric ceramic, and internal electrode layers, is explained.

<MLCC Sample>

$BaTiO_3$ was used as the primary component material for dielectric ceramic. Auxiliary component powder of 0.1 μm or less in average grain size was added to multiple types of $BaTiO_3$ material powders having varying average grain sizes (BT sizes) of 0.12 μm, 0.10 μm, 0.08 μm, and 0.05 μm to prepare dielectric green sheets of dielectric ceramic. The blending ratio of primary component and auxiliary component was fixed to "Primary component:Auxiliary component=97:3 (ratio by weight)" in each condition.

Conductive paste was prepared using Ni powder of roughly 0.1 μm in average grain size, and screen-printed onto the dielectric green sheets. The dielectric green sheets were then sintered under different temperature conditions so that the thickness of the sintered dielectric layer would become 0.4 μm to 0.5 μm and thickness of the sintered internal electrode layer would become 0.5 μm to 0.6 μm, to prepare multiple MLCC samples. With all prepared MLCCs, the chip dimensions were 1.0 mm×0.5 mm×0.5 mm (1005 size) and the number of layers was 100.

<Evaluation Method>

(1) Evaluation of Grain Size Distribution of Dielectric Ceramic

The MLCC sample was cut on its surface in the stacking direction near the center using the ion milling method and the section was captured with a scanning electron microscope (SEM), and the grain sizes of sintered grains constituting the dielectric layer being dielectric ceramic were measured by image analysis processing based on the captured micrograph (the section was captured in such a way that the viewing angle of the SEM micrograph would become a 10-μm square). To capture the grain boundaries clearly on the SEM micrograph, the sample was heat-treated beforehand at 1180° C. for 5 minutes in the same ambience used in the sintering process (mixture gas comprising $N_2$, $H_2$ and $H_2O$) to thermally etch the grain interfaces.

The maximum sintered grain width was measured in two directions, namely the stacking direction of the dielectric layer (longitudinal width) and the direction crossing at right angles with the stacking direction (lateral width), and the average was evaluated as the grain size. Then, the volume ratio to the sintered grains constituting the entire dielectric layer, of those sintered grains whose grain size is in a range of 0.02 μm to 0.15 μm (these grains are hereinafter sometimes referred to as "specified small-diameter grains" or simply as "small-diameter grains"), was used as the value of grain size distribution to be evaluated. The volume of a sintered grain can be obtained by approximating the volume of a sphere whose diameter corresponds to the applicable grain size. By using this approximation, the total sum of volumes of all grains occupying the area observed by the SEM was obtained, and the percentage to the volume of all grains, of the total sum of volumes of individual small-diameter grains present in the applicable grain size range (0.02 μm to 0.15 μm), was evaluated. This was repeated in at least 20 random locations and the average was defined as the volume ratio of specified small-diameter grains.

(2) Measurement of Dielectric Constant

The sintered and oxidized MLCC was let stand undisturbed for 1 hour in a thermostatic chamber of 150° C. and then let stand undisturbed for 24 hours at room temperature of 25° C. to align the conditions, after which the capacitance Cm was measured using an impedance analyzer. The voltage application condition for this measurement was set to 1 kHz, 1.0 Vrms. Formula (1) below was used to obtain the specific dielectric constant $\in$ from the measured capacitance Cm.

$$Cm = \in \times \in_0 \times n \times S/t \qquad \text{Formula (1)}$$

Here, $\in_0$ represents the dielectric constant in vacuum, while n, S and t represent the number of dielectric layers, area of the internal electrode layer, and thickness of one dielectric layer, respectively.

It should be noted that, to obtain sufficient capacitance with a ceramic capacitor whose chip conforms to the 1005 size standard and which has 100 layers, the specific dielectric constant of the dielectric ceramics must be at least 3500 or more.

(3) Evaluation of Probability of Shorting

1 VDC of voltage was applied between the external electrodes of MLCC samples and the ratio obtained by dividing the number of samples whose insulation resistance was less than 1 kΩ, by the total number of samples tested, was evaluated as the probability of shorting. Table 1 provided later shows the probabilities of shorting measured on at least 100 MLCC samples under each condition.

Increase in the probability of shorting leads to greater vulnerability of the MLCC product in terms of current leakage and voltage resistance. Here, a probability of shorting of 10% or lower was considered acceptable (specified range) for a MLCC sample comprising 100 layers. Incidentally, statistics show that, as long as the quality is such that the probability of shorting of a MLCC comprising 100 layers is 10% or lower, the probability of shorting of a MLCC comprising 400 layers or so, which corresponds to a product level, becomes 35% or lower. At a probability of shorting in this range, the required product yield (at least 50%) can be achieved sufficiently.

(4) Evaluation of incidence of Structural Defects

The chip of the MLCC sample was embedded in resin and fixed and then polished in this condition in the stacking direction to expose a section of dielectric layers and internal electrode layers, and this section was visually inspected or enlarged and captured using an optical microscope. Then, the ratio obtained by dividing the number of samples having cracks or delamination (inter-layer separation) observed in the laminate structure inside the observed section, by the total number of samples inspected, was evaluated as the incidence of structural defects. Table 1 shows the incidences of structural defects evaluated on at least 100 randomly selected MLCCs under each condition. It should be noted that the incidence of structural defects is desirably less than 2% at most.

<Evaluation Results>

The evaluation results of MLCC samples produced under the respective conditions are explained by referring to Table 1.

tion, the samples of Condition Nos. 4 and 5 had a probability of shorting exceeding 10%, which was outside the specified range. The probability of shorting deteriorated under these conditions probably because the volume ratio of specified small-diameter grains was less than 1%, resulting in a sufficient number of inter-crystal grain boundaries not being secured in the dielectric layers.

(2) Condition Nos. 6 to 10

The samples of Condition Nos. 6 to 10 represent examples where the average grain size of $BaTiO_3$ being the primary component of material powder was 0.10 μm. Among these, the samples of Condition Nos. 8 and 9 whose sintering temperature was 1220 to 1240° C., average grain size was 0.22 μm to 0.24 μm and volume ratio of specified small-diameter grains was 1.5 to 2.6% were confirmed to have the required specific dielectric constant of 3500 or more and probability of shorting of 10% or less. They also had a favorable incidence of structural defects of less than 2%.

With the samples of Condition Nos. 6 and 7 whose volume ratio of specified small-diameter grains exceeded 10%, the specific dielectric constant of dielectric ceramics did not reach the specified level of 3500 due to the size effect. In the

TABLE 1

| Condition No. | Material powder grain size of BT primary component (μm) | Sintering temperature (° C.) | Average grain size (μm) | Volume ratio of small-diameter grains (%) | Specific dielectric constant (—) | Electrical resistance as probability of shorting (%) | Incidence of structural defects (%) |
|---|---|---|---|---|---|---|---|
| *1  | 0.12 | 1180 | 0.13 | 24.9 | 2694 | 0  | 0 |
| *2  |      | 1200 | 0.17 | 11.0 | 3224 | 1  | 0 |
| 3   |      | 1220 | 0.23 | 2.8  | 3837 | 3  | 0 |
| *4  |      | 1240 | 0.27 | 0.8  | 4235 | 11 | 1 |
| *5  |      | 1260 | 0.31 | 0.2  | 4623 | 37 | 2 |
| *6  | 0.10 | 1180 | 0.12 | 24.9 | 2873 | 0  | 0 |
| *7  |      | 1200 | 0.15 | 13.0 | 3265 | 0  | 0 |
| 8   |      | 1220 | 0.22 | 2.6  | 4193 | 3  | 1 |
| 9   |      | 1240 | 0.24 | 1.5  | 4312 | 6  | 1 |
| *10 |      | 1260 | 0.28 | 0.5  | 4724 | 20 | 2 |
| *11 | 0.08 | 1160 | 0.12 | 15.2 | 3296 | 0  | 0 |
| 12  |      | 1180 | 0.15 | 8.6  | 3732 | 1  | 0 |
| 13  |      | 1200 | 0.20 | 3.2  | 4283 | 3  | 0 |
| 14  |      | 1220 | 0.25 | 1.0  | 4617 | 10 | 1 |
| *15 |      | 1240 | 0.28 | 0.4  | 4817 | 22 | 2 |
| 16  | 0.05 | 1140 | 0.13 | 9.0  | 3685 | 1  | 0 |
| 17  |      | 1160 | 0.16 | 6.3  | 3969 | 1  | 0 |
| 18  |      | 1180 | 0.20 | 2.9  | 4250 | 3  | 0 |
| *19 |      | 1200 | 0.25 | 0.9  | 4763 | 11 | 1 |
| *20 |      | 1220 | 0.27 | 0.5  | 4932 | 18 | 2 |

*indicates a condition producing a result outside the specified range (reference example).

(1) Condition Nos. 1 to 5

The MLCC samples prepared under Condition Nos. 1 to 5 represent examples where the average grain size of $BaTiO_3$ being the primary component of dielectric ceramic material powder was 0.12 μm. Among these, the sample of Condition No. 3 whose sintering temperature was 1220° C., average grain size of total sintered grains was 0.23 μm and volume ratio of specified small-diameter grains (of a grain size of 0.02 μm to 0.15 μm) had a 2.8% grain size distribution, had a specific dielectric constant of 3500 or more, and probability of shorting relating to electrical durability of 10% or less. Additionally, the MLCC product had good reliability, as no cracks or other structural defects were observed.

With the samples of Condition Nos. 1 and 2, the specific dielectric constant was less than 3500 specified for dielectric ceramics. This is probably due to the influence of size effect based on the fact that the volume ratio of small-diameter grains has a grain size distribution exceeding 10%. In addimeantime, the sample of Condition No. 10 whose average grain size was 0.28 μm and volume ratio of specified small-diameter grains was 0.5% had a relatively uniform crystal grain size distribution, indicating that a sufficient number of grain boundaries could not be secured. This resulted in a probability of shorting of 20% and incidence of structural defects of 2%, with the sample being judged as not offering the required reliability.

(3) Condition Nos. 11 to 15

The samples of Condition Nos. 11 to 15 represent examples where the average grain size of $BaTiO_3$ being the primary component of material powder was 0.08 μm. Among these, the samples of Condition Nos. 12 to 14 whose sintering temperature was 1180 to 1220° C., average grain size was 0.15 to 0.25 μm, and volume ratio of specified small-diameter grains was 8.6 to 1.0%, exhibited a high specific dielectric constant and good reliability.

With the sample of Condition No. 11, on the other hand, the specific dielectric constant did not reach the specified level of 3500 due to the small average grain size of 0.12 μm and high volume ratio of specified small-diameter grains of 15.2%. With the sample of Condition No. 15, while the average grain size was 0.28 μm, the volume ratio of specified small-diameter grains was low at 0.4%, and the probability of shorting was 18% and incidence of structural defects was 2%, all being outside the specified ranges.

(4) Condition Nos. 16 to 20

The samples of Condition Nos. 16 to 20 represent examples where the average grain size of $BaTiO_3$ being the primary component of material powder was 0.05 μm. The samples of Condition Nos. 16 to 18 whose sintering temperature was 1140 to 1180° C., average grain size was 0.13 to 0.20 μm, and volume ratio of specified small-diameter grains was 2.9 to 9.0%, exhibited a high specific dielectric constant and good reliability.

With the sample of Condition No. 19 whose volume ratio of specified small-diameter grains was 0.9% relative to an average grain size of 0.25 μm, the probability of shorting exceeded the specified level of 10% and was out of the specified range. Also, the sample of Condition No. 20 whose average grain size was 0.27 μm and volume ratio of specified small-diameter grains was 0.5% had a probability of shorting of 18% and incidence of structural defects of 2%, indicating lower reliability, where a sufficient number of grain boundaries could not be obtained.

<Analysis of Conforming Conditions>

Further analysis of the aforementioned evaluation results of dielectric ceramic whose primary component is $BaTiO_3$ and thickness is approx. 0.5 μm or less find that favorable specific dielectric constant and reliability (probability of shorting, incidence of structural defects) would be achieved under the ranges of conditions specified below.

(1) Crystal Grain Size Distribution of Dielectric Ceramic

Figure 2:
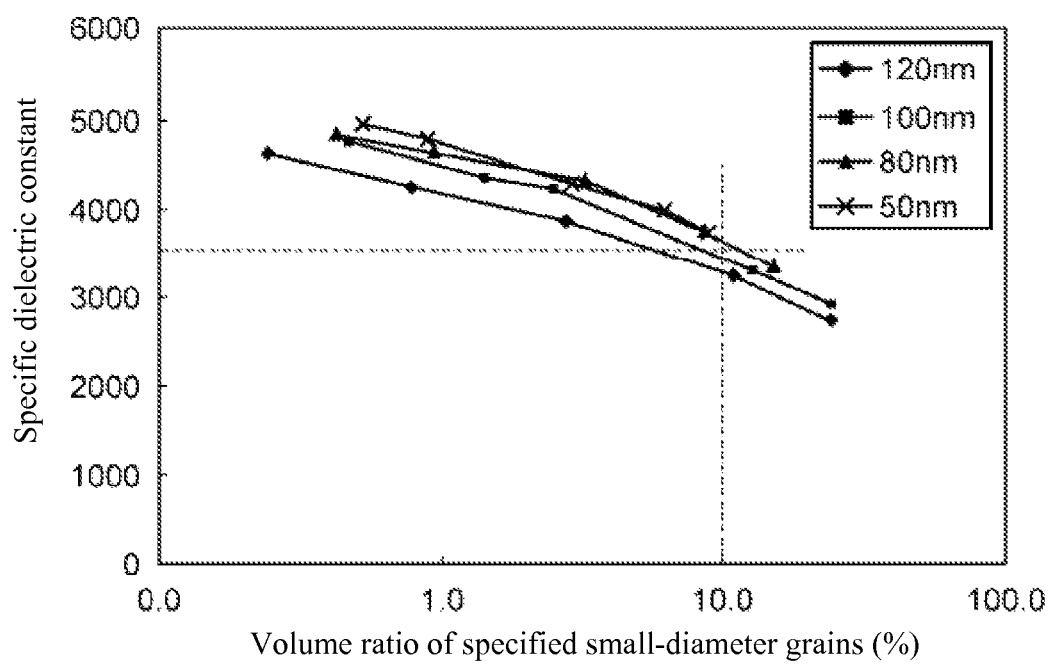
FIG. 2 is a graph of test results showing the relationships of volume ratio of specified small-diameter grains on one hand, and specific dielectric constant on the other, of dielectric ceramic samples.
Figure 3:
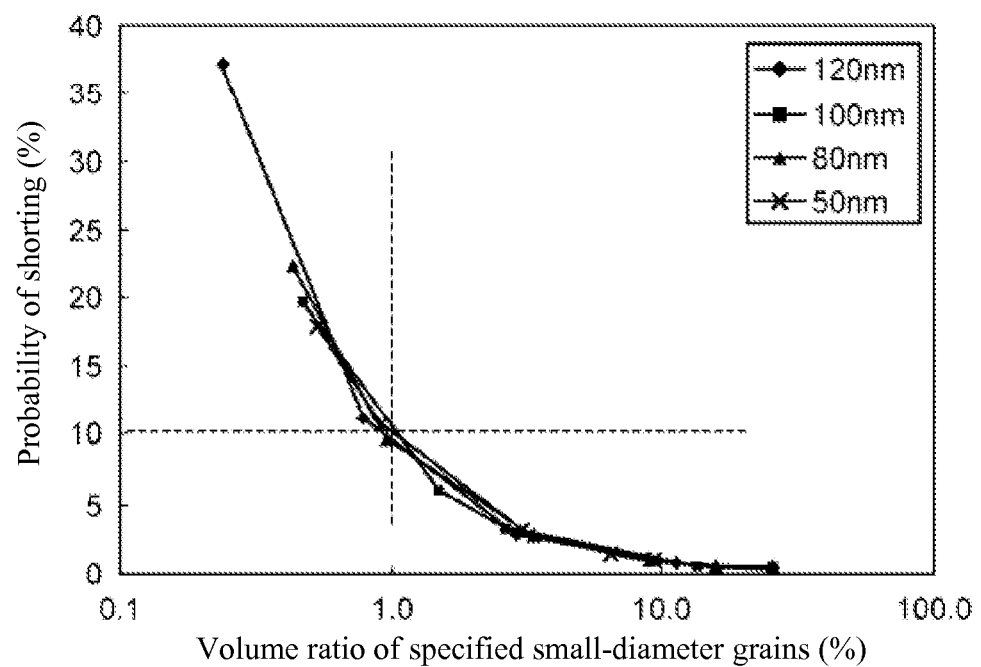
FIG. 3 is a graph of test results showing the relationships of volume ratio of specified small-diameter grains on one hand, and probability of shorting on the other, of dielectric ceramic samples.
Figure 4:
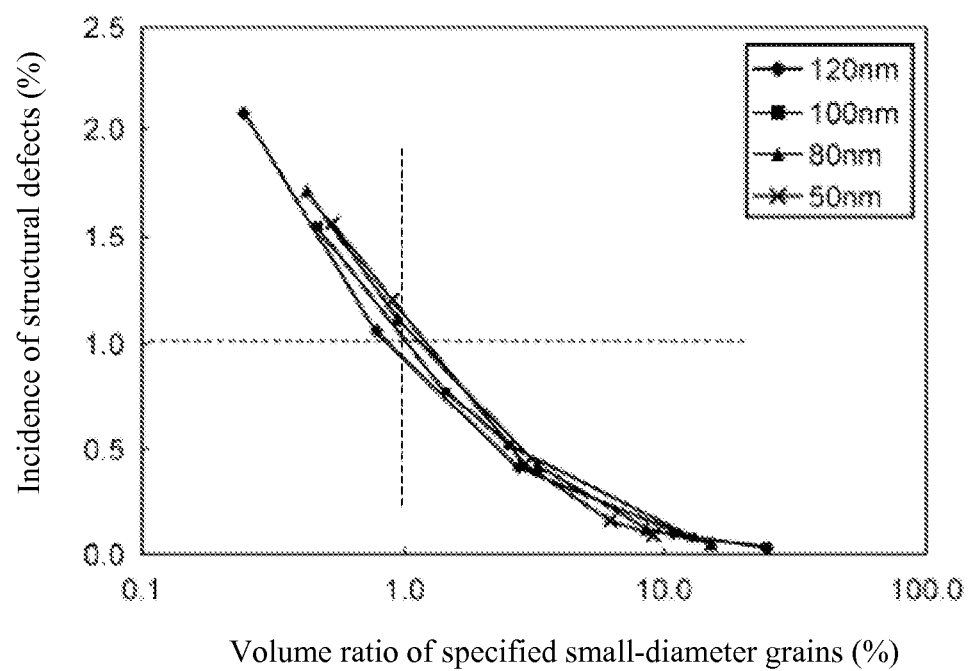
FIG. 4 is a graph of test results showing the relationships of volume ratio of specified small-diameter grains on one hand, and incidence of structural defects on the other, of dielectric ceramic samples.

FIG. 2 is a graph showing the relationships of volume ratio of specified small-diameter grains (of a grain size of 0.02 μm to 0.15 μm) to total grains on one hand, and specific dielectric constant on the other, as obtained on the basis of results in Table 1. Additionally, FIG. 3 shows the relationships of volume ratio of specified small-diameter grains and probability of shorting, while FIG. 4 shows the relationships of volume ratio of specified small-diameter grains and incidence of structural defects.

Qualitatively it is assumed that the higher the volume ratio of small-diameter grains in the grain size distribution of dielectric ceramics, the lower the dielectric constant becomes due to the size effect. As shown in FIG. 2, all samples tested achieved the specified specific dielectric constant of 3500 or more when the volume ratio of specified small-diameter grains was 10% or less. On the other hand, the number of crystal grain boundaries decreases when the volume ratio of specified small-diameter grains is low in the grain size distribution, indicating that the insulation resistance will likely drop and structural defects generate. As shown in FIG. 3, all samples whose volume ratio of specified small-diameter grains was 1% or more achieved the specified probability of shorting of 10% or less. Also, as shown in FIG. 4, the incidence of structural defects was less than 2% as long as the volume ratio of specified small-diameter grains was 1% or more.

Based on the above, it is desirable, in order to obtain favorable dielectric constant and reliability with dielectric ceramics of approx. 0.5 μm in thickness, that the crystal grain size distribution is such that the volume ratio to total sintered grains of those whose grain size is in a range of 0.02 μm to 0.15 μm (specified small-diameter grains) is 1% to 10%.

(2) Average Grain Size of Dielectric Ceramics

Figure 5:
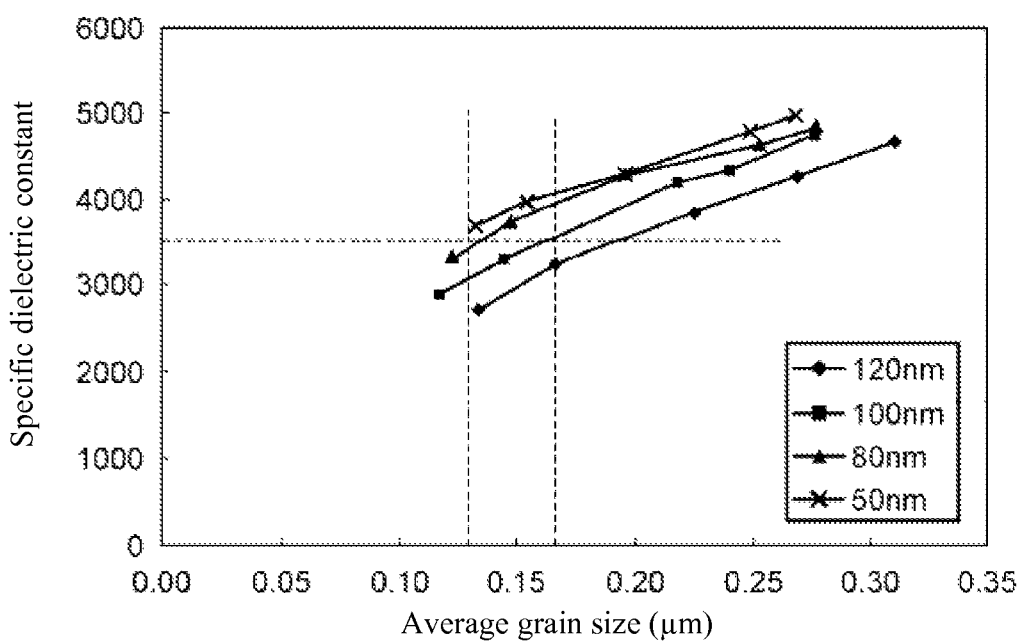
FIG. 5 is a graph of test results showing the relationships of average grain size on one hand, and specific dielectric constant on the other, of dielectric ceramic samples.
Figure 6:
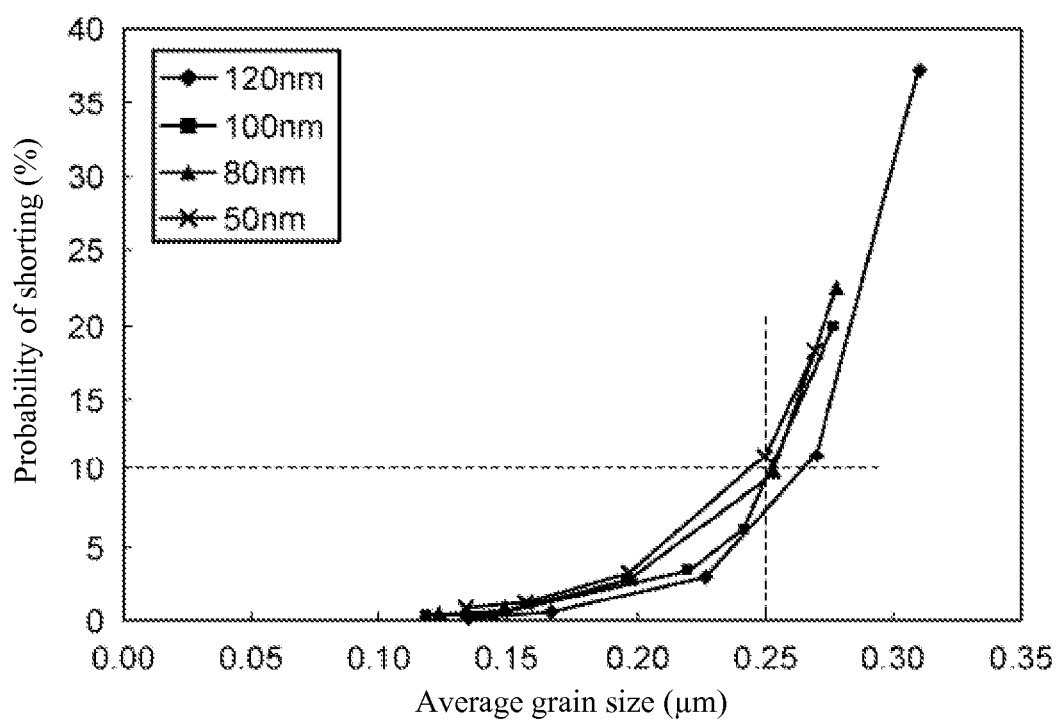
FIG. 6 is a graph of test results showing the relationships of average grain size on one hand, and probability of shorting on the other, of dielectric ceramic samples.
Figure 7:
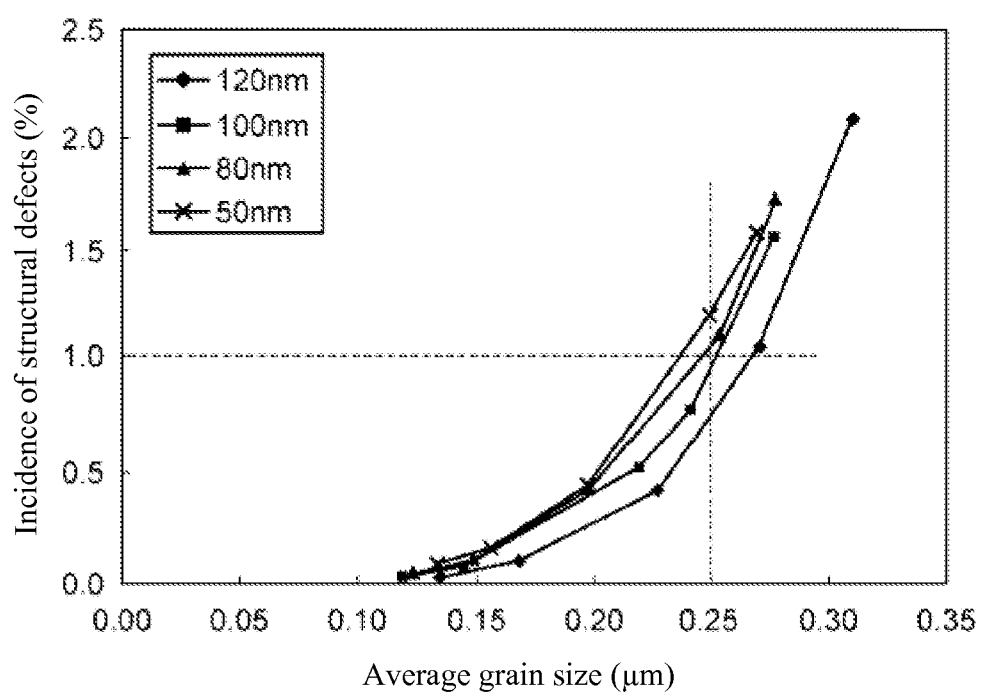
FIG. 7 is a graph of test results showing the relationships of average grain size on one hand, and incidence of structural defects on the other, of dielectric ceramic samples.

FIG. 5 shows the relationships of average grain size of dielectric ceramic on one hand, and specific dielectric constant on the other, as obtained on the basis of results in Table 1. Additionally, FIG. 6 shows the relationships of average grain size and probability of shorting, while FIG. 7 shows the relationships of average grain size and incidence of structural defects.

The smaller the grain sizes of grains constituting the dielectric ceramic, the lower the dielectric constant becomes due to the size effect. As shown in FIG. 5, samples with an average grain size of 0.13 μm or more achieved the specified specific dielectric constant of 3500 or more, although to some limited degree. In addition, a specific dielectric constant of 3500 or more was confirmed under all conditions tested where the average grain size was greater than 0.17 μm.

On the other hand, too large a grain size of dielectric ceramic might cause the number of inter-crystal grain boundaries to decrease and reliability to deteriorate as a result. As for the evaluation of reliability, the specified probability of shorting of 10% or less was achieved as long as the average grain size was 0.25 μm or less, as shown in FIG. 6. Also, the incidence of structural defects was less than 2% when the average grain size was 0.25 μm or less, as shown in FIG. 7.

Based on the above, it is desirable for the average grain size to be 0.25 μm or less to ensure sufficient reliability of dielectric ceramic, while it is desirable for the average grain size to be 0.13 μm or more to ensure sufficient dielectric constant.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-139801, filed Jun. 21, 2012, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A dielectric ceramic whose primary component is an $ABO_3$ compound (A contains Ba (barium) and B contains Ti (titanium)) and which is constituted by dielectric sintered grains, where a volume ratio to total dielectric sintered grains of those whose grain size is in a range of 0.02 μm to 0.15 μm is 1% to 10%.

2. A dielectric ceramic according to claim 1, wherein an average grain size of total sintered grains is in a range of 0.13 μm to 0.25 μm.

3. A method of manufacturing a dielectric ceramic, comprising:

preparing dielectric green sheets by adding an auxiliary component of 0.1 μm or less in grain size to a material powder for primary component constituted by an $ABO_3$ compound (A contains Ba (barium) and B contains Ti (titanium)) and having a grain size of 0.05 μm to 0.12 μm; and sintering the dielectric green sheets so that a volume ratio to total dielectric sintered grains of those whose grain size is in a range of 0.02 μm to 0.15 μm becomes 1% to 10%.

4. A method of manufacturing a dielectric ceramic according to claim 3, wherein an average grain size of total sintered grains constituting the dielectric ceramic is in a range of 0.13 μm to 0.25 μm.

5. A multilayer ceramic capacitor formed by alternately stacking dielectric layers constituted by dielectric sintered grains, and electrode layers, wherein:

a thickness of each dielectric layer is 0.5 μm or less; and a primary component of the dielectric layer is an $ABO_3$ compound (A contains Ba (barium) and B contains Ti (titanium)) and a volume ratio to total dielectric sintered grains of those whose grain size is in a range of 0.02 μm to 0.15 μm is 1% to 10%.

6. A multilayer ceramic capacitor according to claim 5, wherein an average grain size of total sintered grains is in a range of 0.13 μm to 0.25 μm.

* * * * *